United States Patent [19]

Ferree et al.

[11] Patent Number: 4,942,793

[45] Date of Patent: Jul. 24, 1990

[54] APPARATUS AND METHOD FOR REMOVING AND REPLACING A FEEDTHROUGH CONNECTOR IN A PRESSURIZED SPACECRAFT HULL

[75] Inventors: Herbert E. Ferree, Hempfield Twp., Westmoreland County; Ellen J. Revelj, Monroeville, both of Pa.

[73] Assignee: Space Industries Partnership, L.P., Webster, Tex.

[21] Appl. No.: 194,620

[22] Filed: May 16, 1988

[51] Int. Cl.$^5$ .............................................. B25B 13/02
[52] U.S. Cl. ........................................ 81/54; 81/121.1; 81/462
[58] Field of Search ....................... 81/121.1, 462, 457, 81/54

[56] References Cited

U.S. PATENT DOCUMENTS 4,714,138 12/1987 Zaccone .............................. 81/121.1
4,817,894  4/1989 Ferree ............................... 244/158 R

OTHER PUBLICATIONS

Publication, "Handbook of Conductor Feedthru Seals for Glovebox Enclosures", Douglas Engineering Company, Inc., 1987; title page, pp. GFS-3, GFS-8, GFS-9 and GFS-10.

*Primary Examiner*—Frederick R. Schmidt
*Assistant Examiner*—Lawrence Cruz

*Attorney, Agent, or Firm*—Venable, Baetjer and Howard

[57] ABSTRACT

An apparatus for removing a feedthrough connector mounted in an internally-threaded access opening in a wall of a pressurized vessel includes an elongated hollow sleeve defining a chamber and having upper and lower opposite open ends. A flange mounting an O-ring is fixed on the lower open end of the sleeve for sealably attaching the sleeve to the vessel wall about the access opening thereof and the connector mounted therein. A cap is sealably mounted to the upper open end of the sleeve for closing the same, but is removable for opening the upper sleeve open end. A tool shaft extends through the cap and is vertically reciprocally movable relative to the cap and through the sleeve chamber between upper and lower sleeve ends. The shaft is operable for engaging the connector, unthreading the same from the wall access opening and lifting the connector to the upper sleeve end. Removal of the cap will remove the shaft and connector engaged therewith from the sleeve. A gate valve mounted to the sleeve inbetween its upper and lower ends is actuatable to sealably close the chamber so as to divide it into upper and lower portions sealed from one another and to open it to allow communication between the upper and lower chamber portions. A vent valve connected in communication with the sleeve about the gate valve is operable to bent atmosphere external of the sleeve with the upper chamber portion thereof.

15 Claims, 3 Drawing Sheets

APPARATUS AND METHOD FOR REMOVING AND REPLACING A FEEDTHROUGH CONNECTOR IN A PRESSURIZED SPACECRAFT HULL

CROSS REFERENCE TO RELATED APPLICATION

Reference is hereby made to the following copending application dealing with related subject matter and assigned to the assignee of the present invention: "Hermetic Feedthrough Change-Out Module Device And Method For Use In A Pressurized Spacecraft Hull" by Herbert E. Ferree, assigned U.S. Ser. No. C7/162,842 and filed Feb. 29, 1988.

BACKGROUND OF THE INVENTION

1. Field of the Invention

The present invention relates generally to the provision of feedthrough penetrations in hermetically sealed vessels and, more particularly, is concerned with an apparatus and method for changing feedthrough connectors in a pressurized spacecraft hull.

2. Description of the Prior Art

For carrying out materials research and production in space as well as many other applications requiring a space environment, an Industrial Space Facility is being constructed for launch and initial operation in the early 1990's. ("Industrial Space Facility" is a trademark of Space Industries, Inc.) The facility is designed to be a reusable, remotely controlled, free-flying space vehicle in low earth orbit. The facility will provide a pressurized shirtsleeve environment with sustainable power, cooling, and telemetry capabilities.

Plans are for the facility to remain in orbit for an extended time, for instance, 30 years. If the facility is to have a useful lifetime of 30 years in orbit, then it must be maintainable. Thus, the environment of the facility must be controlled and the facility must be capable of regular servicing while in orbit. Specifically, atmosphere and temperature control are required in the interior of the facility to support certain manufacturing processes or experiments, and for man-tended periodic servicing.

Many spacecraft hull penetrations are necessary for supplying electrical signals and power to the interior and for furnishing fluids used for cooling and atmosphere. Feedthrough connectors can be installed in these hull penetrations, with cables connected to the outside ends of the connectors, using special winged nuts required for astronaut EVA service. However, winged nuts need not be used on the cable connectors which are inside of the hull. The use of nuts on the feedthrough connectors to fasten them to the pressure hull is avoided by making internally threaded holes in the hull matable with external threads on the feedthrough connectors. The feedthrough connector is thus installed in a threaded hole in the pressure hull similar to a bulkhead fitting, but without an external nut.

Since the facility is intended for a 30-year useful life, it is important that provision be made for maintainability. Some means must be devised which facilitates removal and replacement or repair of a feedthrough connector which becomes defective for any of several reasons such as the presence of a crack in an insulator which allows air leakage or of a faulty electrical connection. Consequently, a need exists for an approach to changing a feedthrough connector with minimum loss of air.

SUMMARY OF THE INVENTION

The present invention provides a feedthrough connector removal and replacement apparatus and method designed to satisfy the aforementioned needs. The apparatus of the present invention provides an airlock which allows replacing a hermetic electrical feedthrough connector with minimal loss of air. The apparatus is vacuum sealed with O-rings and allows removal of the connector through a gate valve which divides the chamber defined in the apparatus into upper (or inner) and lower (or outer) portions. By proper operation of the gate valve coordinated with unthreading and withdrawal of the connector from the lower to upper chamber portions, the connector can be removed from service for replacement by another connector without significant loss of air from the facility interior.

The apparatus of the present invention is particularly adapted for use in changing a feedthrough connector in the pressurized hull of a spacecraft, such as the above industrial space facility. However, it is also applicable to other hermetically sealed vessels which use feedthrough connectors to transmit electrical power, fluid or motion through the vessel wall and which have a need for at least periodic serviceability from inside the vessel.

Accordingly, the present invention is directed to an apparatus for removing a connector mounted in an access opening in a wall of a pressurized vessel. The apparatus comprises: (a) an elongated hollow sleeve defining a chamber and having upper and lower opposite open ends; (b) means defined on the lower sleeve open end for sealably attaching the sleeve to the vessel wall about the access opening thereof and the connector mounted therein; (c) a cap sealably mounted to the upper sleeve open end so as to close the same, the cap being removable for opening the upper sleeve open end; and (d) an elongated member such as a shaft mounted and extending through the cap for vertical reciprocal movement relative to the cap and through the sleeve chamber between upper and lower ends of the sleeve, the shaft being operable for engaging the connector, removing the same from the access opening in the wall and lifting the connector from the lower to upper end of the sleeve, the shaft and connector engaged therewith being removable from the sleeve upon removal of the cap therefrom.

The apparatus further comprises: (e) first valve means in the form of a gate valve mounted to the sleeve between and spaced from the upper and lower ends thereof and being actuatable between a first displaced condition wherein the sleeve chamber is closed between the upper and lower sleeve open ends dividing the chamber into upper and lower portions being sealed from one another and preventing vertical movement of the shaft from the upper to lower end of the sleeve and a second condition wherein the sleeve chamber is opened between the upper and lower sleeve open ends communicating the upper and lower chamber portions with one another and permitting vertical movement of the shaft between the upper and lower ends of the sleeve; and (f) second valve means in the form of a vent valve connected in communication with the sleeve above the gate valve and being operable to vent atmosphere external of the sleeve with the upper chamber portion of the sleeve.

More particularly, the sleeve attaching means includes an annular flange attached on the lower sleeve open end, extending radially outward therefrom, and having an annular recess defined in an underside thereof which circumscribes the lower sleeve open end. A yieldably resilient annular sealing member is disposed in flange recess and projects outwardly from the flange underside for making sealing contact with the vessel wall when the sleeve is attached thereto.

Further, the cap includes a top wall having a central hole receiving the shaft therethrough, an outer annular side wall attached to and depending from an underside of the top wall and sized to interfit within the upper open end of the sleeve, and an inner annular side wall attached to and depending from the underside of the top wall about the hole therethrough. The cap outer side wall has at least one annular recess defined therein which opens toward the upper sleeve open end and seats a yieldably resilient sealing member for making sealing contact with the upper sleeve open end. The cap inner side wall defines a central bore aligned with the top wall hole for receiving the shaft therethrough. Also, the cap inner side wall has at least one annular recess defined therein which opens into the central bore and seats a yieldably resilient sealing member for making sealing contact with the shaft.

Also, the elongated shaft has a connector engaging and gripping element coupled to its lower end and a handle attached on its upper end and disposed exteriorly of the cap on the sleeve. The handle is operable for rotating the shaft to untighten (and withdraw) and (insert and) retighten the feedthrough connector.

The present invention also relates to a method of removing a feedthrough connector threadably and sealably mounted in a threaded access opening in a wall of a vessel sealably containing an interior pressure greater than the pressure at the exterior of the vessel. The method comprises the steps of: (a) sealably attaching over the access opening in the vessel wall and the connector threadably and sealably mounted therein at an interior side of the vessel wall a lower open end of an elongated hollow sleeve having a chamber open at both its lower and upper ends; (b) movably mounting a tool shaft in sealed relation through and with the upper end of the sleeve and pushing the tool shaft through the sleeve chamber toward the vessel wall access opening; (c) engaging with the threaded connector a gripping element mounted of a leading end of the tool shaft in the sleeve chamber; (d) rotating the tool shaft to unthread the connector from the vessel wall access opening and thereby unseal the access opening and allow reduction in the pressure within the sealed sleeve chamber to the same pressure as that at the exterior of the vessel and below that at the interior of the vessel; (e) pulling the tool shaft through the sleeve chamber away from the vessel wall to lift the unthreaded connector from adjacent the lower end of the sleeve chamber to adjacent the upper end thereof; (f) sealing off an upper portion of the sleeve chamber containing the unthreaded connector from a lower portion of the chamber which is open to the unsealed access opening; (g) venting the upper portion of the sleeve chamber to the higher pressure at the interior of the vessel; and (h) unsealing the upper end of the sleeve chamber and removing the tool shaft and unthreaded connector therefrom.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
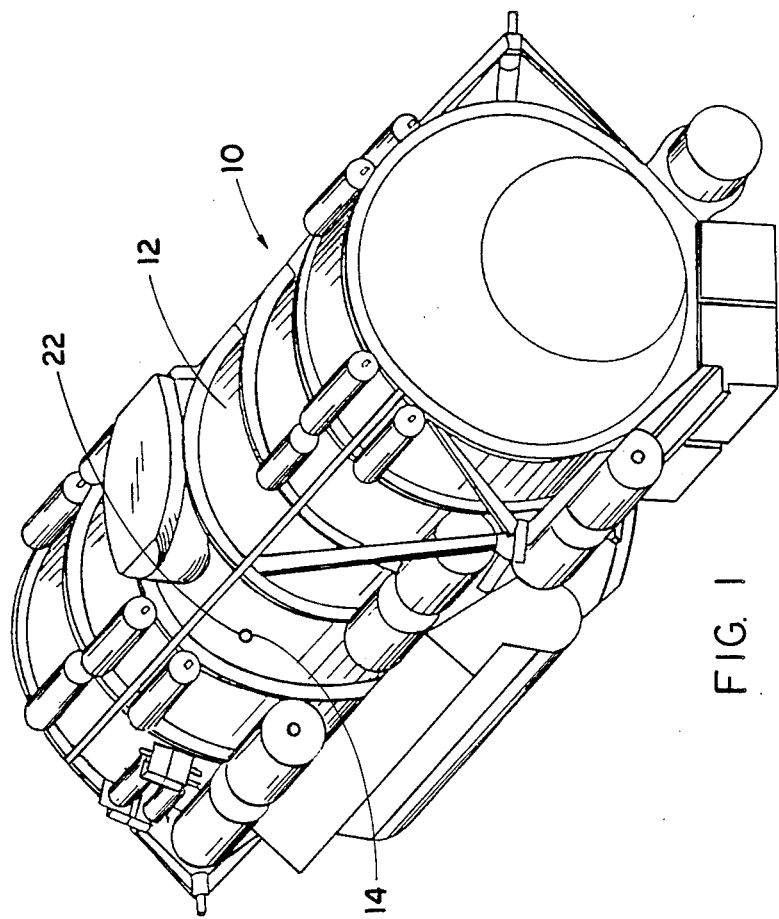
FIG. 1 is a perspective view of the pressure hull and attachments of an Industrial Space Facility employing a feedthrough connector adapted to be changed by an apparatus of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is shown the pressure hull portion of a hermetically sealed vessel such as an Industrial Space Facility 10 having a large cylindrical-shaped pressurized hull 12. (The space facility 10 is shown in FIG. 1 without its external meteoroid shields mounted thereon for protection from meteorites and for radiating heat.) The pressurized hull 12 of the spacecraft or facility 10 can employ one or more feedthrough connectors 14 (only one being shown), being shown in greater detail in FIGS. 2 to 4.

Figure 2:
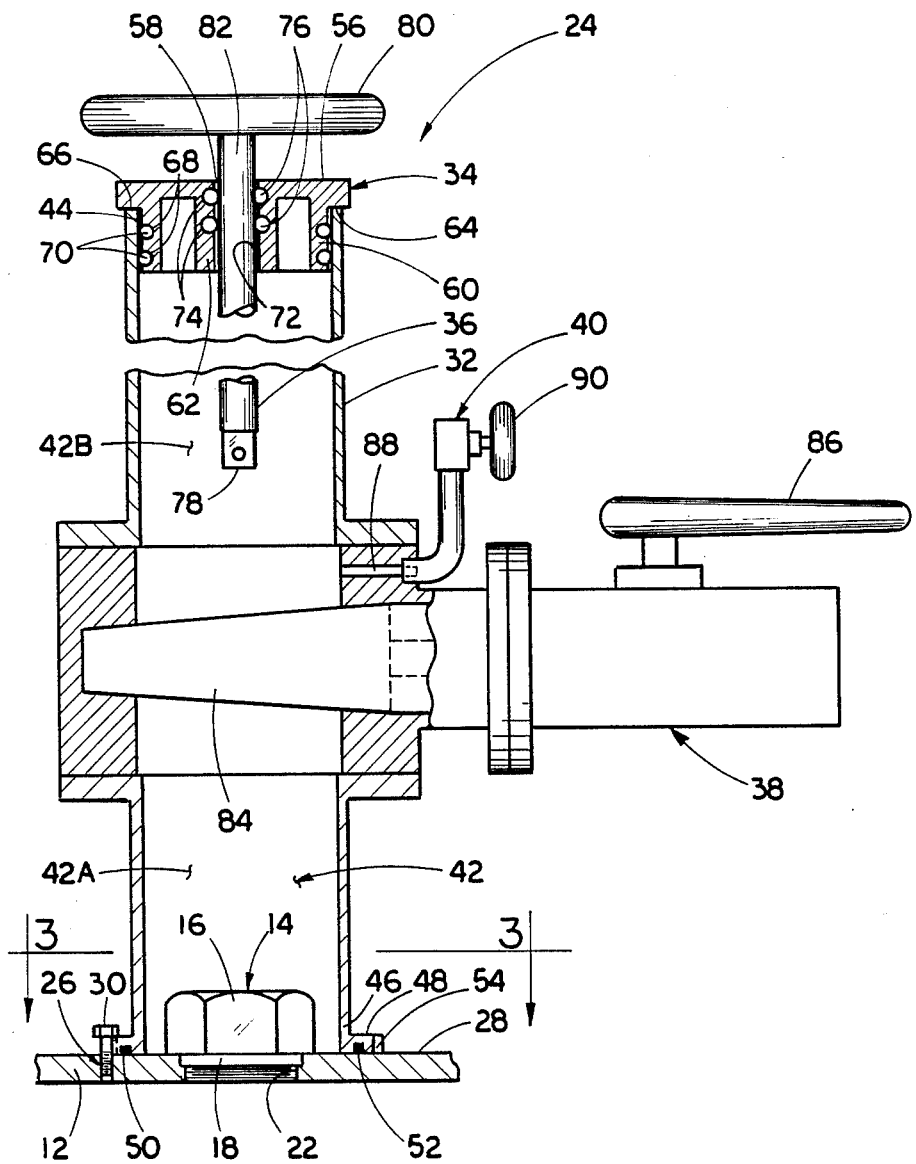
FIG. 2 is a longitudinal axial sectional view, partly in elevation, of the apparatus of the present invention applied to the pressurized hull of the facility for removing the feedthrough connector therefrom.
Figure 3:
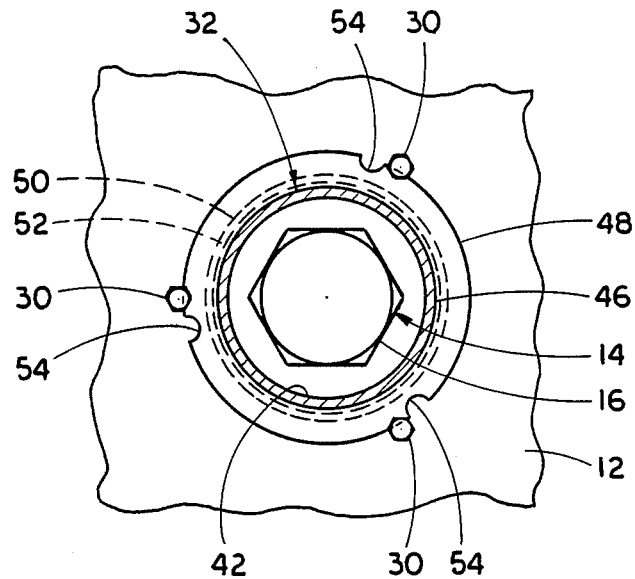
FIG. 3 is a top plan view of a mounting base portion of a chamber-defining sleeve of the apparatus and of the feedthrough connector in the pressurized hull as seen along line 3—3 of FIG. 2.
Figure 4:
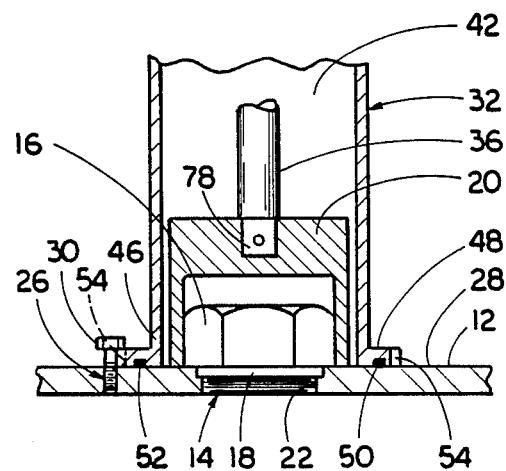
FIG. 4 is a fragmentary longitudinal axial sectional view of the mounting flange on the apparatus sleeve as seen along 4—4 of FIG. 3, showing also a socket element on the lower end of central tool shaft of the apparatus.

As viewed in FIGS. 2 to 4, the feedthrough connector 14 includes a male head portion 16 and an externally-threaded neck portion 18 both being adapted for attachment with inside and outside cables (not shown) for transmission of fluids or electrical power through the pressurized hull 12 of the facility 10. The head portion 16 and neck portion 18 are also adapted respectively for mating engagement by a female socket device 20 (FIG. 4) and for threaded anchoring or mounting in an internally-threaded access opening 22 formed in the pressurized hull 12 of the facility 10.

As depicted in FIG. 2, a connector replacement apparatus, generally designated by the numeral 24 and constituting the preferred embodiment of the present invention, is illustrated for removing the feedthrough connector 14 from the threaded access opening 22 and then later replacing either it or another connector back into the opening. A plurality of attachment rivets or studs 26 are rigidly mounted to the interior surface 28 of the pressurized hull 12 about the threaded access opening 22. The studs 26 have enlarged heads 30 spaced above the hull interior surface 28 which provide means for mounting the apparatus 24 thereon.

In its basic components, the connector replacement apparatus 24 includes an elongated hollow cylindrical sleeve 32, a removable closure cap 34, an elongated tool shaft 36, a gate valve 38 and a vent valve 40. The hollow sleeve 32 of the apparatus 24 defines a chamber 42 between upper and lower opposite open ends 44,46 of the sleeve.

An annular flange 48 fixed on the lower open end 46 of the sleeve 32 provides means for sealably attaching the sleeve 32 to the vessel hull wall 12 over and about the access opening 22 therethrough and the feedthrough connector 14 threadably mounted therein. The annular flange 48 extends radially outward from the lower end 46 of the sleeve 32 and has a continuous annular recess 50 defined in an underside of the flange 48 resting upon the interior surface of the hull wall 12. The recess 50 encompasses or circumscribes the lower open end 46 of the sleeve 32 and seats a yieldably resilient annular sealing member in the form of an O-ring 52. The O-ring 52 seated in the recess 50 of the flange projects outwardly from the flange underside so as to make sealing contact with the vessel hull wall 12 once the sleeve 32 is attached thereto.

Referring also to FIGS. 3 and 4, for attaching the flange 48 to the hull wall 12 a plurality of circumferentially spaced cutouts 54 are defined about the periphery of the flange 48. The flange 48 in being so configured provides a bayonet-type attachment to the vessel wall 12. In preparation for attaching the sleeve 32 to the vessel wall 12, the sleeve 32 is held upright over the access opening 22 and oriented so as to align the cutouts 54 in its flange 48 with the enlarged heads 30 of the attachment studs 26 mounted to the vessel wall 12 about the access opening 22. The cutouts 54 are sized and shaped relative to the stud heads 30 to provide clearance sufficient to allow the flange 48 to be inserted past the enlarged stud heads 30. Then, the space between the heads 30 and the vessel wall interior surface 28 is sized relative to the thickness of the flange 48 to accommodate tight fitting of the peripheral edge of the flange therebetween upon rotation of the sleeve 32 and flange 48 therewith to the position seen in FIG. 3.

The closure cap 34 of the apparatus 24 is diametrically sized and adapted to fit within the upper open end 44 of the sleeve 32 so as to sealably close the same. However, the cap 34 is also removable for opening the upper end 44 of the sleeve 32. More particularly, the closure cap 34 includes a top wall 56 having a central hole 58 therethrough, an outer continuous annular side wall 60, and an inner continuous annular side wall 62.

The outer side wall 60 of the closure cap 34 is attached to and depends from an underside of the cap top wall 56 spaced inwardly from its peripheral edge so as to define a continuous annular peripheral shoulder 64 thereon adapted to seat upon an upper edge 66 of the sleeve upper end 44, as shown in FIG. 1. Further, the outer side wall 60 of the cap 34 has an outside diameter slightly less than the inside diameter of the upper sleeve end 44 adapting the cap outer side wall 60 to interfit within the upper open end 44 of the sleeve 32.

For providing a sealed relationship between the cap 34 and the sleeve upper end 44, the outer side wall 60 has at least one and preferably a pair of axially-spaced continuous annular recesses 68 defined thereabout its exterior surface and opening outwardly toward the interior of the sleeve upper end 44. Yieldably resilient flexible annular sealing members in the form of O-rings 70 are seated in the respective outer side wall recesses and project outwardly therefrom so as to make sealing contact with interior of the sleeve upper open end 44.

The inner side wall 62 of the closure cap 34 is attached to and depends from the underside of cap top wall 56 about the hole 58 therethrough. The inner side wall 62 defines a central bore 72 aligned with the hole 58 through the cap top wall 56. The top wall 56 and inner side wall 62 of the closure cap 34 are thereby adapted to receive therethrough the tool shaft 36 of the apparatus 24.

Also, for providing a sliding sealed relationship between the cap 34 and the tool shaft 36, the inner side wall 62 has at least one and preferably a pair of axially-spaced continuous annular recesses 74 defined thereabout its interior surface and opening outwardly toward the exterior of the tool shaft 36. Yieldably resilient flexible annular sealing members in the form of O-rings 76 are seated in the respective inner side wall recesses 74 and project outwardly therefrom so as to make sealing contact with exterior of the tool shaft 36.

Therefore, in the manner as just described above, the end or closure cap 34 makes sealing contact with the sleeve upper end 44 and the tool shaft 36 so as to seal off the sleeve chamber 42 from the interior of the vessel 10 once the sleeve flange 48 has been sealably attached to the wall 12. The sealing relationship between the cap 34 and the tool shaft 36 is maintained even though the shaft is mounted through the cap top wall hole 58 and inner side wall bore 72 for vertical reciprocal movement relative to the cap 34 and through the sleeve chamber 42 between the upper and lower ends 44,46 of the sleeve 32. The closure cap 34 is preferably merely slip fitted with the sleeve upper end 44 with sealing pressure being provided by the O-rings 70. Of course, a different manner of attachment could be provided such as a threaded connection.

Referring now particularly to FIGS. 2 and 4, the tool shaft 36 is seen to have a connector engaging and gripping element such as the female socket device 20 releasably coupled to its lower or leading end 78 and disposed within the chamber 42. A handle 80 is attached on the upper end 82 of the shaft 36 and disposed exteriorly of the chamber 42. The handle 80 is adapted to be used to push and pull on the tool shaft 36 for moving the shaft 36 axially through the chamber 42 and the socket device 20 into and out of gripping engagement with the feedthrough connector 14, to rotate the tool shaft 36 for unthreading and rethreading the connector 14 from and into the access opening 22 to untighten and retighten the connector, and to move the shaft between the lower and upper ends 46,44 of the sleeve 32 to lift and remove or lower and replace the connector 14 respectively from and to the access opening 22 in the vessel wall 12. Finally, the shaft 36 and connector 14 therewith can be removed from the sleeve chamber 42 upon removal of the closure cap 34, like a bottle stopper, from the upper open end 44 of the sleeve 32. Once removed from the chamber 42, the connector 14 can be disengaged and removed from the socket device 20 and a new connector substituted in its place for replacement in the access opening 22.

However, before removal of the closure cap 34 from the upper end 44 of the sleeve 32 which would permit air pressure loss from the positive pressure interior (for instance about 15 psi) of the vessel 10 to the near vacuum pressure exterior thereof through the chamber 42 and the opened access opening 22, the gate valve 38 of the apparatus 24 is employed to seal off a lower portion 42A of the chamber 42 from an upper portion 42B thereof. For this purpose, the gate valve 38, which by way of example can be one sold by Kurt Lesker Company, is mounted to the sleeve 32 about midway between and spaced from the upper and lower ends 44,46 thereof. It has a gate device 84 actuatable by rotating a handle 86 of the valve 38 between first and second 180-degree displaced conditions.

In the first condition as seen in FIG. 2, the gate device 84 extends across the sleeve chamber 42 so as to close it between the upper and lower sleeve open ends 44,46, thereby dividing the chamber 42 into the upper and lower portions 42B,42A sealed from one another and blocking and preventing vertical movement of the tool shaft 36 from between the upper and lower ends 44,46 of the sleeve 32. On the other hand, in the second condition (not shown), the gate device 84 is withdrawn from across the sleeve chamber 42 so to open the sleeve chamber between the upper and lower ends 44,46 thereof, thereby communicating the upper and lower chamber portions 42B,42A with one another and permitting vertical movement of the tool shaft 36 between the upper and lower ends 44,46 of the sleeve 32.

Once the gate valve 38 is actuated to its first condition, the vent valve 40 can be employed to vent the upper chamber portion 42B to the interior pressure of the vessel 10 without causing escape of pressure through the sealed off lower chamber portion 42A and opened access opening 22. The vent valve 40 has a conduit 88 by which it is mounted to the sleeve 32 so as to connect the upper chamber portion 42A in communication with the vessel interior above the gate valve 38 via the valve 40. A knob 90 is provided on the vent valve 40. The knob 90 is turned to either open or close the valve and either vent the upper chamber portion 42A to the vessel interior or seal it off therefrom.

The apparatus 24 is applicable to removal of connectors that have outside diameters as large as two to three inches and six to seven inches in height. The apparatus 24 can be made of materials such as aluminum allowing it to weigh less than twenty pounds, thus having a relatively low weight which reduces the cost of sending it into orbit. Also, the same apparatus 24 can service different feedthrough connectors. The apparatus 24 can be manually or robotically operated.

Because of the sliding seal between the sleeve 32 and the tool shaft 36, the socket device 20 on the leading end of the shaft 36 can first be placed over the feedthrough connector 14 in gripping engagement therewith, followed by sliding of the sleeve 32 downward on the shaft 36 into position for attachment to the studs 26 on the vessel wall 12. Then, the shaft 36 is rotated to unscrew the connector 14 and withdraw it from the access opening 22 in the vessel wall 12, thus venting the sealed chamber 42 to the exterior vacuum. Pulling up on the shaft 36 withdraws the connector 14 above the gate valve 38 so that the latter can then be closed to seal off the upper chamber portion 42B from the lower chamber portion 42A. The upper chamber portion 42B can then be vented to the interior vessel pressure by opening the vent valve 40. With the pressure equalized, the stopper-like O-ring sealed closure cap 34 can be lifted and removed from the sleeve upper end 44 along with the shaft 36 and connector 14. A new feedthrough connector can then be installed in the access opening 22 by reversal of the above-outlined steps.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An apparatus for removing a connector mounted in an access opening in a wall of a pressurized vessel, said apparatus comprising:
   (a) an elongated hollow sleeve defining a chamber and having upper and lower opposite open ends;
   (b) sleeve attaching means defined on said lower sleeve open end for sealably attaching said sleeve to the vessel wall about the access opening thereof and the connector mounted therein;
   (c) a cap sealably mounted to said upper sleeve open end so as to close the same, said cap being removable for opening said upper sleeve open end;
   (d) an elongated member mounted to and extending through said cap and being vertically reciprocally movable relative to said cap and through said sleeve chamber between upper and lower ends of said sleeve, said elongated member being operable for engaging the connector, removing the same from the access opening in the wall and lifting the connector from said lower to upper end of said sleeve, said elongated member and connector engaged therewith being removable from said sleeve upon removal of said cap therefrom;
   (e) first valve means mounted to said sleeve between and spaced from said upper and lower ends thereof and being actuatable between a first displaced condition wherein said sleeve chamber is closed between said upper and lower sleeve open ends dividing said chamber into upper and lower portions being sealed from one another and preventing vertical movement of said elongated member from said upper to lower end of said sleeve and a second condition wherein said sleeve chamber is opened between said upper and lower sleeve open ends communicating said upper and lower chamber portions with one another and permitting vertical movement of said elongated member between said upper and lower ends of said sleeve; and
   (f) second valve means connected in communication with said sleeve above said first valve means and being operable to vent atmosphere external of said sleeve with said upper chamber portion of said sleeve.

2. The apparatus as recited in claim 1, wherein said sleeve attaching means includes:
   an annular flange attached on said lower sleeve open end and extending radially outward therefrom, said flange having an annular recess defined in an underside thereof which circumscribes said lower sleeve open end; and
   a yieldably resilient annular sealing member disposed in said recess of said flange and projecting outwardly from said flange underside for making sealing contact with the vessel wall when said sleeve is attached thereto.

3. The apparatus as recited in claim 1, wherein said sleeve attaching means includes an annular flange attached on said lower sleeve open end and extending radially outward therefrom, said flange having, a plurality of circumferentially spaced cutouts defined therein which allow said flange to be inserted past enlarged heads on studs mounted to the vessel wall about the access opening and then between the stud heads and vessel wall upon rotation of said sleeve and its flange therewith.

4. The apparatus as recited in claim 1, wherein said cap includes:
- a top wall having a central hole receiving said elongated member therethrough;
- an outer annular side wall attached to and depending from an underside of said top wall and sized to interfit with said upper open end of said sleeve, said side wall having at least one annular recess defined therein which opens toward said upper sleeve open end; and
- a yieldably resilient annular sealing member disposed in said recess of said side wall and projecting outwardly therefrom for making sealing contact with said upper sleeve open end.

5. The apparatus as recited in claim 4, wherein outer side wall of said cap is sized to interfit within said upper sleeve open end and said recess is defined on the exterior of said side wall.

6. The apparatus as recited in claim 4, wherein a pair of said recesses are defined on said outer side wall and a pair of said sealing members are disposed respectively in said recesses.

7. The apparatus as recited in claim wherein said cap includes:
- a top wall having a central hole receiving said elongated member therethrough;
- an inner annular side wall attached to and depending from an underside of said top wall about said hole therethrough, said inner side wall defining a central bore aligned with said hole through said top wall for receiving said elongated member therethrough, said inner side wall having at least one annular recess defined therein which opens into said central bore; and
- a yieldably resilient annular sealing member disposed in said recess of said inner side wall and projecting outwardly therefrom for making sealing contact with said elongated member.

8. The apparatus as recited in claim 7, wherein a pair of said recesses are defined on said inner side wall and a pair of said sealing members are disposed respectively in said recesses.

9. The apparatus as recited in claim 1, wherein said elongated member is a shaft having a connector engaging and gripping element coupled to its lower end and a handle attached on its upper end and disposed exteriorly of said cap on said sleeve, said handle being operable for rotating said shaft to untighten and retighten the connector.

10. The apparatus as recited in claim 1, wherein:
- said first valve means is a reciprocal gate valve having a lever being operable for actuating said gate valve; and
- said second valve means is a vent valve having a knob being operable for actuating said vent valve.

11. An apparatus for removing a feedthrough connector threadably mounted in a threaded access opening in a wall of a vessel containing an internal pressure greater than the pressure external to said vessel, said apparatus comprising:
- (a) an elongated hollow sleeve defining a chamber and having upper and lower opposite open ends;
- (b) means defined on said lower sleeve open end for sealably attaching said sleeve to the vessel wall about the access opening thereof and the connector mounted therein;
- (c) a cap mounted to said upper sleeve open end so as to close the same, said cap being removable for opening said upper sleeve open end, said cap including a top wall having a central hole therethrough and an outer annular side wall attached to and depending from an underside of said top wall and sized to interfit with said upper open end of said sleeve, said outer side wall having at least one annular recess defined therein which opens toward said upper sleeve open end, said cap further including an inner annular side wall attached to and depending from an underside of said top wall about said hole therethrough, said inner side wall defining a central bore aligned with said hole through said top wall and having at least one annular recess defined therein which opens into said central bore;
- (d) a first yieldably resilient annular sealing member disposed in said recess of said cap outer side wall and projecting outwardly therefrom for making sealing contact with said upper sleeve open end;
- (e) a second yieldably resilient annular sealing member disposed in said recess of said cap inner side wall and projecting outwardly therefrom;
- (f) a shaft mounted to and extending through said hole in said cap top wall and said bore in said cap inner side wall in sliding sealing contact with said second annular sealing member therein and being vertically reciprocally movable relative to said cap and through said sleeve chamber between upper and lower ends of said sleeve, said shaft having a connector engaging and gripping element coupled to its lower end and a handle attached on its upper end and disposed exteriorly of said cap on said sleeve, said handle being operable for moving said element into gripping engagement with the connector, rotating said shaft and element therewith to untighten and retighten the connector, moving the shaft to remove and replace the connector from and to the access opening in the wall and from and to said lower and upper ends of said sleeve, said shaft, element and connector engaged therewith being removable from said sleeve upon removal of said cap therefrom;
- (g) a gate valve mounted to said sleeve between and spaced from said upper and lower ends thereof and being actuatable between a first displaced condition wherein said sleeve chamber is closed between said upper and lower sleeve open ends dividing said chamber into upper and lower portions being sealed from one another and preventing vertical movement of said shaft and element from said upper to lower end of said sleeve and a second condition wherein said sleeve chamber is opened between said upper and lower sleeve open ends communicating said upper and lower chamber portions with one another and permitting vertical movement of said shaft and element between said upper and lower ends of said sleeve; and
- (h) a vent valve connected in communication with said sleeve above said gate valve and being operable to vent atmosphere external of said sleeve with said upper chamber portion of said sleeve.

12. The apparatus as recited in claim 11, wherein said sleeve attaching means includes:

an annular flange attached on said lower sleeve open end and extending radially outward therefrom, said flange having an annular recess defined in an underside thereof which circumscribes said lower sleeve open end; and a yieldably resilient annular sealing member disposed in said recess of said flange and projecting outwardly from said flange underside for making sealing contact with the vessel wall when said sleeve is attached thereto;

said flange further having a plurality of circumferentially spaced cutouts defined therein which allow said flange to be inserted past enlarged heads on studs mounted to the vessel wall about the access opening and then between the stud heads and vessel wall upon rotation of said sleeve and its flange therewith.

13. The apparatus as recited in claim 11, wherein outer side wall of said cap is sized to interfit within said upper sleeve open end and said recess is defined on the exterior of said side wall.

14. The apparatus as recited in claim 13, wherein a pair of said recesses are defined on said cap outer side wall and a pair of said sealing members in the form of O-rings are disposed respectively in said recesses.

15. The apparatus as recited in claim 11, wherein a pair of said recesses are defined on said cap inner side wall and a pair of said sealing members in the form of O-rings are disposed respectively in said recesses.

* * * * *